United States Patent [19]

Mitchell

[11] Patent Number: 5,079,278
[45] Date of Patent: Jan. 7, 1992

[54] ENHANCED OIL RECOVERY PROFILE CONTROL WITH CROSSLINKED ANIONIC ACRYLAMIDE COPOLYMER GELS

[75] Inventor: Thomas O. Mitchell, Hopewell Township, Mercer County, N.J.

[73] Assignee: Mobil Oil Corporation, Fairfax, Va.

[21] Appl. No.: 595,721

[22] Filed: Oct. 9, 1990

Related U.S. Application Data

[63] Continuation-in-part of Ser. No. 453,241, Dec. 13, 1989, abandoned, which is a continuation-in-part of Ser. No. 283,398, Dec. 12, 1988, abandoned.

[51] Int. Cl.$^5$ ............................................. C08K 7/02
[52] U.S. Cl. ............................ 523/130; 524/547; 524/555; 524/510; 525/328.4; 525/360; 525/374
[58] Field of Search ............... 523/130; 524/510, 555, 524/547; 525/328.4, 360, 374

[56] References Cited

U.S. PATENT DOCUMENTS

| | | | |
|---|---|---|---|
| 3,918,521 | 11/1975 | Shavely, Jr. et al. | 166/272 |
| 4,246,124 | 1/1981 | Swanson | 252/8.55 R |
| 4,309,523 | 1/1982 | Engelhardt et al. | 526/240 |
| 4,479,894 | 10/1984 | Chen et al. | 252/8.55 D |
| 4,489,783 | 12/1984 | Shu | 166/272 |
| 4,521,579 | 6/1985 | Engelhardt et al. | 526/287 |
| 4,565,249 | 1/1986 | Pebdani et al. | 166/303 |
| 4,579,667 | 4/1986 | Echt et al. | 252/8.55 D |
| 4,785,028 | 11/1988 | Hoskin et al. | 523/130 |
| 4,787,451 | 11/1988 | Mitchell | 166/270 |
| 4,788,228 | 11/1988 | Ryles | 523/130 |
| 4,793,416 | 12/1988 | Mitchell | 166/268 |

FOREIGN PATENT DOCUMENTS 0007013 1/1980 European Pat. Off. ............ 524/510

OTHER PUBLICATIONS

Testbook of Polymer Science; Second Edition; Fred W. Billmeyer, Jr., Wiley-Interscience, a Division of John Wiley and Sons, Inc., Copyright 1962, 1971; pp. 75-84.
Mobil Docket 4073, Ser. No. 917,324, filed Oct. 9, 1986.

*Primary Examiner*—Joseph L. Schofer
*Assistant Examiner*—Mark Sweet
*Attorney, Agent, or Firm*—Alexander J. McKillop; Charles J. Speciale; Michael J. Mlotkowski

[57] ABSTRACT

An aqueous polymeric gel-forming composition capable of selectively plugging highly permeable zones in subterranean oil-bearing formations. The composition comprises an aqueous solution of an anionic acrylamide copolymer of high molecular weight, comprising about 5 to 95 weight percent of 2-acrylamido-2-methylpropanesulfonic acid, about 2 to 95 weight percent of N-vinyl-N-methyl acetamide and about 5 to 93 weight percent of acrylamide, and a crosslinking agent selected from the group consisting of transition metal ions, phenolic resins and amino resins. The compositions of this invention will form stable gels in brines of wide-ranging salinity and are effective at the pH levels encountered in carbon dioxide and water flooding operations. Also provided is a process for selectively plugging regions of higher permeability within an oil-bearing formation to improve sweep efficiency during a fluid flood oil recovery operation.

14 Claims, No Drawings

ENHANCED OIL RECOVERY PROFILE CONTROL WITH CROSSLINKED ANIONIC ACRYLAMIDE COPOLYMER GELS

This is a continuation-in-part of copending application Ser. No. 453,241, filed on Dec. 13, 1989, now abandoned, which is a continuation-in-part of copending application Ser. No. 283,398, filed on Dec. 12, 1988, now abandoned.

FIELD OF THE INVENTION

This invention relates to gel-forming crosslinked compositions which are useful in the control of permeability in subterranean oil-bearing formations. Use of these gels in the oil recovery process of this invention can yield improved sweep efficiency during fluid flooding operations. More particularly, this invention relates to the use of synthetic, high molecular weight, anionic acrylamide copolymers to form the crosslinked gel compositions of this invention.

BACKGROUND OF THE INVENTION

In the production of oil from subterranean formations, it is usually possible to recover only a small fraction of the total oil present in the formation by so-called primary recovery methods which utilize only the natural forces present in the reservoir. To recover oil beyond that which is produced by primary methods, a variety of supplemental production techniques have been employed. In these supplemental techniques, commonly referred to as secondary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of an aqueous or carbon dioxide flooding medium into an oil-bearing formation, either alone or in combination with other fluids. In practice, a number of injection and production wells will be used in a given field arranged in conventional patterns such as a line drive, five spot or inverted five spot, seven spot or inverted seven spot.

In the use of the various flooding techniques, it has become a common expedient to add various polymeric thickening agents to the drive fluid to increase its viscosity to a point where it approaches that of the oil which is desired to be displaced, thus improving the displacement of oil from the formation. The polymers used for this purpose are often said to be used for "mobility" control.

Another problem encountered is that certain injected drive fluids may be much lighter than the reservoir fluids and thus separate by gravity, rising toward the top of the flowing region and resulting in the bypassing of the lower regions. This phenomenon is known as gravity override.

Also encountered in the use of various flooding techniques is a situation caused by the fact that different regions or strata have different permeabilities. In this situation, the drive fluid preferentially enters the regions of higher permeability due to the lower resistance to flow present rather than the regions of low permeability where significant volumes of oil often reside.

It therefore is often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desirability of designing a viscous slurry capable of sealing off the most permeable layers so that the drive fluid would be diverted to the underswept, "tighter" regions of the reservoir, became evident. This led to the use of oil/water emulsions, as well as gels and polymers for controlling the permeability of the formations. This process is frequently referred to as "profile" control, a reference to the control of the vertical permeability profile of the reservoir. Profile control agents which have been proposed include oil/water emulsions, gels, e.g., lignosulfate gels and polymers, with polymers being the most extensively applied in recent years.

Of the secondary and tertiary enhanced oil recovery processes, waterflooding, carbon dioxide flooding, miscible or immiscible gas flooding and steam flooding are of particular interest and importance. As indicated, profile control can often improve performance in such processes by reducing the effect of permeability inhomogeniety or stratification and gravity override. A gel suitable for profile control must be stable enough to continue to impede flow for long periods of time at the given temperature, salinity and pH of a particular oil-bearing reservoir. A gel must also have adequate mechanical strength to resist the pressures which will be applied during the subsequent oil recovery flooding step. There are a variety of materials commercially available for profile control, all of which perform differently and have their own, often unique limitations.

Among the many polymers examined thus far are polyacrylamides, polysaccharides, celluloses, furfural-alcohol and acrylic-epoxy resins, silicates and polyisocyanurates. Proposals have been made for the use of inorganic polymers, especially inorganic silicates, as permeability control agents. For example, U.S. Pat. Nos. 4,009,755 and 4,069,869 disclose the use of inorganic silicates for this purpose. In the permeability control method described in these patents, an organic polymeric permeability control agent such as a crosslinked polyacrylamide or polysaccharide is first injected into the reservoir, followed by an aqueous solution of an alkaline metal silicate and a material that reacts with the silicate to form a silicate gel which plugs the high permeability regions in the formation. An alkaline metal silicate is typically used as the source of silica and the gelling agent is usually an acid or acid-forming compound such as a water soluble ammonium salt, a lower aldehyde, an aluminum salt or an alkaline metal aluminate. The problem, however, with many inorganic silicates is that their solutions are often quite viscous and stable only under alkaline conditions. As soon as conditions become acidic, a silicate gel is formed. Although this is the desired reaction for plugging the formation, it may occur prematurely.

Other attempts have been made to achieve profile control. One such attempt is described in U.S. Pat. No. 4,498,539 to Bruning, which discloses delayed gelable compositions for injection of a water thickening amount of a polymer capable of gelling in the presence of a crosslinking agent so that after the composition has penetrated into an underground formation and positioned itself preferentially in the highly permeable strata, the delayed gelation is triggered by in-situ hydrolysis of an ester which reduces the pH of the composition to the gelable range thereby producing in-depth plugging of the strata with the gelled polymer.

A group of polymeric thickeners which has been used in waterflooding operations is the xanthan polysaccharides. Xanthan polysaccharides are produced by the action of bacteria of the genus Xanthomonas on carbohydrates. For example, U.S. Pat. Nos. 3,757,863 and 3,383,307 disclose mobility control by the use of polysaccharides in the presence of polyvalent metal ion crosslinking agents. U.S. Pat. No. 3,810,882 discloses the possibility of using certain reducible complex metal ions as cross-linking agents for polysaccharides. U.S. Pat. Nos. 4,078,607 and 4,104,193 describe a method for improving the efficiency of waterflooding operations by a particular polysaccharide prehydration technique. U.S. Pat. No. 4,413,680 describes the use of crosslinked polysaccharides for selective permeability control in oil reservoirs.

U.S. Pat. No. 3,908,760 describes a polymer water flooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations. The use of polyvalent metal ions for crosslinking xanthan polysaccharides and other polymers which are to be used for permeability control is described in U.S. Pat. Nos. 4,009,755, 4,069,869 and 4,413,680. The use of phenol/aldehyde crosslinking agents with xanthan polysaccharides and other polymers is disclosed in U.S. Pat. Nos. 4,323,123 and 4,440,228.

Another type of polysaccharide which has been experimented with in the area of profile control is the non-xanthan, heteropolysaccharide S-130. S-130 belongs to the group of non-xanthan welan gums. S-130 is produced by fermentation with a microorganism of the genus Alcaligenes. Another welan gum heteropolysaccharide, known as S-194, is also produced by fermentation with a microorganism of the genus Alcaligenes. U.S. Pat. No. 4,658,898 discloses the use of welan gum S-130 in saline waters. Crosslinking with trivalent cations, such as chromium, aluminum, zirconium and iron is also disclosed. Additionally, crosslinking with organic compounds containing at least two positively charged nitrogen atoms is disclosed in U.S. Pat. No. 4,658,898.

U.S. Pat. No. 4,787,451, the inventor of which is also the inventor of the present invention, discloses the use of melamineformaldehyde and other amino resins to crosslink various polymers. U.S. Pat. No. 4,787,451 is hereby incorporated by reference in its entirety.

A major part of the work conducted in the area of profile control has dealt with the use of polyacrylamides. Polyacrylamides have been used both in their normal, non-crosslinked form as well as in the form of crosslinked metal complexes, as described, for example, in U.S. Pat. Nos. 4,009,755, 4,069,869 and 4,413,680. Shear degradation during injection and sensitivity to reservoir brines tend to diminish the beneficial effects derived from these polyacrylamides.

U.S. Pat. No. 4,246,124 discloses gelled compositions suitable as fracture fluids and water diversion agents in which a polymeric viscosifier selected from a group including the polyacrylimides is crosslinked with small amounts of phenolic and aldehyde compounds. The use of the monomer 2-acrylamido-2-methyl-propanesulfonic acid (AMPS) ® and its alkali metal salts for copolymerization with acrylamide or methacrylamide are disclosed therein and form a preferred group of copolymers. These copolymers, when used in the examples of U.S. Pat. No. 4,246,124, were used at a concentration of 1% to achieve the desired water thickening effect.

U.S. Pat. No. 4,579,667 discloses the use of an anionic partially hydrolyzed polyacrylamide together with a water-soluble cationic polyamide-epichlorohydrin resin to from gelled aqueous compositions in brines having salt concentrations of 1 to 10% at a pH of about 3 to 11. Suitable anionic polyacrylamides disclosed therein include any partially hydrolyzed homopolymer of acrylamide, homopolymers of methacrylamide and copolymers of acrylamide or methacrylamide with other water-soluble vinyl addition monomers containing or capable of generating an anionic charge.

U.S. Pat. No. 4,785,028, a co-inventor of which is also the inventor of this invention, discloses aqueous gels formed by partially hydrolyzing an aqueous solution of a terpolymer comprising 5 to 95% by weight of the AMPS ® monomer, 5 to 95% by weight of N-vinyl-N-methyl acetamide (VMA) and 0 to 80% by weight of acrylamide and thereafter crosslinking the resultant hydrolyzed polymer intermediate with transition metal ions, melamine/formaldehyde resin or resorcinol/formaldehyde resin. The aforementioned partial hydrolysis is conducted by refluxing the polymer with an alkali metal hydroxide in an amount of about 0.5 to 5.0% by weight for about 7 to 16 hours at a temperature of about 100° C. to form the polymer intermediate. U.S. Pat. No. 4,785,028 is incorporated by reference in its entirety. The terpolymers used in U.S. Pat. No. 4,785,028 have a relatively low weight-average molecular weight, generally about 0.8 to about $1.0 \times 10^6$, as compared with the polymers useful in the practice of this invention. As such, high terpolymer concentrations are required to practice the invention of U.S. Pat. No. 4,785,028.

As demonstrated, there are a variety of materials, many of which are commercially available, which have some utility in profile control. As is known, a gel suitable for profile control must be stable enough to continue to impede flow for long periods of time. This requires not only that the gel formed by the polymer should be stable enough to withstand the relatively high temperatures encountered in some reservoirs—in itself, a difficult requirement—but also that the gel should be stable over as wide a range of pH conditions as possible so that the polymer will have the potential of being used in reservoirs of different kinds, e.g. sandstone, carbonate rock and others. Stability to various oilfield brines is another desirable requirement. Many of the known types of organic gel forming polymers are unsatisfactory in one respect or another, e.g. temperature stability, brine stability, pH range, so that there has been a continuing need for new and different polymers for permeability control purposes. Biopolymers such as xanthan gums are unstable above about 140° F. Synthetic polyacrylamides, depending upon the nature and amount of other functional groups such as alkyl sulfonate or pyrrolidone, as well as other factors, will have a temperature above which they will not be useful at a given salinity. Certain polyacrylamides, such as those disclosed in U.S. Pat. No. 4,785,028 require high dosages and a time-consuming hydrolysis step to form useful polymeric gels.

Therefore, what is needed is an economical gel which can be used for profile control during enhanced oil recovery under the harsh conditions encountered in a subterranean formation.

It is therefore an object of this invention to provide for a new use of a known polymer heretofore utilized as a viscosifier of water-based fluids.

It is another object of this invention to provide a crosslinked acrylamide copolymer gel suitable for profile control in enhanced oil recovery operations.

It is a yet further object of this invention to provide for a substantially stable gel when high temperatures and/or low pH's are encountered in a reservoir.

It is a yet still further object of this invention to provide for a gelation reaction which will proceed in a reservoir environment of any level of salinity.

It is yet another object of this invention to provide for an economical gel for use as a profile control agent during enhanced oil recovery operations.

It is still yet another object of this invention to provide a process for selectively plugging regions of higher permeability within an oil-bearing subterranean formation to obtain improved sweep efficiency during a fluid flood oil recovery operation.

SUMMARY OF THE INVENTION

According to the present invention, there is provided a gel-forming composition and a process for utilizing the gel-forming composition to control the permeability of subterranean, oil-bearing formations. An anionic acrylamide copolymer of high molecular weight, comprising about 5 to 95 weight percent. 2-acrylamido-2-methylpropanesulfonic acid; about 2 to 95 weight percent of N-vinyl-N-methyl acetamide; and about 5 to 93 weight percent of acrylamide, wherein the copolymer has a weight-average molecular weight of at least $5 \times 10^6$, is crosslinked with an agent selected from the group consisting of transition metal ions, phenolic resins and amino resins to form an aqueous gel. Such a gel is useful in water flooding and carbon dioxide flooding oil recovery operations where improved sweep efficiency is desired. For example, a gel-forming composition of this invention may be injected into a region of higher permeability within an oil-bearing subterranean formation to selectively plug this more permeable region and thus improve the sweep efficiency of a subsequent fluid flooding operation. The gels which are formed are stable under the harsh conditions often encountered when producing fluids from a subterranean formation during enhanced oil recovery operations.

DESCRIPTION OF THE PREFERRED EMBODIMENTS

In preparing the gel-forming composition of this invention, an anionic acrylamide copolymer of high molecular weight is used which is produced by copolymerizing at 0° to 130° C., an aqueous mixture of monomers comprising about 5 to 95 weight percent 2-acrylamido-2-methylpropanesulfonic acid; about 2 to 95 weight percent of N-vinyl-N-methyl acetamide; and about 5 to 93 weight percent of acrylamide. The well-known Trommssdorff-Norrish method of copolymerization may be utilized and the resultant copolymer has a weight-average molecular weight of at least $5 \times 10^6$. Copolymers produced in the aforementioned manner having weight-average molecular weights of at least $7 \times 10^6$ are more preferred. A method for making kindred polymers is disclosed in U.S. Pat. No. 4,521,579, incorporated by reference in its entirety.

It is to be understood that whenever reference is made within this disclosure to the term "molecular weight", it is the weight-average molecular weight that is being made reference to, rather than the number-average molecular weight. A suitable and preferred method for determining weight-average molecular weight is the light-scattering photometer method discussed at pages 75-84 of the "Textbook of Polymer Science, Second Edition," by F. W. Billmeyer, Jr., published by Wiley Interscience, John Wiley and Sons, Inc., New York (1971), the contents of which are incorporated by reference in their entirety.

A copolymer preferred for use herein is marketed by American Hoechst Corporation, located in Houston, Tex., and is sold under the trade name ®Hostamer V 3140. This product is sold as a viscosifier of water-based fluids having medium to high salinity. The copolymer is derived from, as is preferred, about 40% by weight of AMPS ®, 30% by weight of acrylamide, and 30% by weight of N-vinyl-N-methyl acetamide. Said copolymer is believed to have a weight-average molecular weight of about 7 to 9 million.

To obtain an aqueous solution of the preferred copolymer, the copolymer should be added slowly to water with vigorous stirring. At 25° C., 0.5 g of the copolymer will dissolve in 100 ml of fresh water (hardness of 90 mg CaO per liter). The manufacturer states that faster and easier dissolving can be achieved by the previous wetting of the granules with small amounts of alcohol, such as isopropanol. By preparing the solution in this manner, the insoluble residue formed is less than 0.2% by weight.

Crosslinking agents useful in the practice of this invention are transition metal ions, phenolic resins and amino resins. Suitable crosslinking agents include polyvalent metal cations such as $Al^{+3}$, $Cr^{+3}$, $Fe^{+3}$, $Sb^{+3}$ and $Zr^{+4}$. Also suitable for crosslinking are multifunctional amines such as diamines. For example, aluminum citrate can be admixed with the polymer or in slugs alternating with polymer slugs. Soluble compounds of $Cr^{+3}$ or $Fe^{+3}$ can be used, or oxidizable compounds of divalent iron such as $FeCl_2$ can be used in conjunction with an oxidant.

In the practice of this invention, a pre-formed phenolic resin can be used; said resin generally obtained by the condensation of phenol or substituted phenols with an aldehyde such as formaldehyde, acetaldehyde and furfural. Additionally, the phenol and aldehyde constituents can be added separately to produce the compositions of this invention, rather than being added as a pre-formed phenolic resin.

Any suitable water-dispersible phenol can be used in the practice of this invention. Phenolic compounds suitable for use in the present invention include phenol, resorcinol, catechol, 4,4'-diphenol, 1,3-dihydroxynaphthalene, pyrogallol, phloroglucinol and other similar compounds. Resorcinol and phenol are the preferred phenolics for most water and carbon dioxide drive applications, with resorcinol being particularly preferred. The choice of a phenol compound will be based largely on the rate of gelation desired. Mixtures of the named phenols are also useful.

A broad range of water-dispersible aldehydes are useful in the practice of the present invention. Both aliphatic and aromatic monoaldehydes and dialdehydes can be used. The useful aliphatic monoaldehydes include those containing from one to ten carbon atoms per molecule, such as formaldehyde, paraformaldehyde, acetaldehyde, proprionaldehyde, butylaldehyde, isobutylaldehyde, heptaldehyde and others. Among the useful dialdehydes are glyoxyl, glutaraldehyde and terephthaldehyde. Mixtures of the various, aforementioned aldehydes are also useful in the practice of the present invention. Of the preferred aldehyde compounds, formaldehyde is particularly preferred.

Amino resins may either be preformed resins, such as the preferred melamine/formaldehyde resins, mixtures of amino compounds and aldehyde compounds or mixtures of preformed resins and aldehyde compounds. The aforementioned aldehyde compounds are also useful in the amino resin crosslinking agents of this invention. Particularly preferred amino resins are disclosed in U.S. Pat. No. 4,787,451, which is incorporated by reference in its entirety.

Of the transition metal ions useful in the practice of this invention, $Cr^{+3}$ ions are particularly preferred for forming gels. Chromic nitrate and chromic chloride have been utilized to form gels. The pH may optionally be adjusted before crosslinking. Redox systems such as sodium dichromate and sodium bisulfite have been utilized to obtain $Cr^{+3}$ ions. Similar redox systems are described in U.S. Pat. No. 3,749,172, which is hereby incorporated by reference. When forming these gels, $Cr^{+3}$ ions are used in a preferred amount of from about 50–750 ppm. As is understood by those skilled in the art, the amount of $Cr^{+3}$ ions, or other transition metal ions, utilized will vary depending upon the molecular weight of the particular polymer utilized. In any event, the metal ions should be present in an amount sufficient to obtain the desired gelling effect.

Gels resultant from crosslinking the anionic acrylamide copolymer are formed in a preferred range of between about pH 5 and pH 8 when forming these gels with $Cr^{+3}$, and in a preferred range between about pH 3 and pH 10 with other crosslinking agents. These gels can be formed in fresh water, distilled water, saline water and synthetic sea water. The amount of organic crosslinking agent useful in the practice of this invention will generally be a small but effective amount sufficient to initiate and cause gelation of an aqueous solution of the acrylamide copolymer. It will generally be found that the amount of amino or phenolic resin useful to form advantageous gels will be in the range of 0.02 to 5.0 weight percent. When preformed resin is not employed, the amount of the amino or phenol compound used will be in the range of 0.01 to about 2.0 weight percent, with concentrations of 0.05 to 1.0 weight percent preferred. The concentration of aldehyde used will be in the range of 0.01 to 3.0 weight percent, with concentrations of 0.1 to 1.0 weight percent preferred.

The amount of the acrylamide copolymer useful in preparing the aqueous crosslinked gels of this invention may vary depending on the particular copolymer used, its purity and the desired properties of the resultant gels. Generally speaking, the quantity of the copolymer used will be a water-thickening or viscosifying amount, that is, an amount which will significantly increase the viscosity of the water to which it has been added. Amounts ranging from about 0.05 to about 1 weight percent are preferred, with amounts ranging from about 0.1 to about 0.5 weight percent particularly preferred. The low concentrations required to form suitable gels are believed to be the result of the high molecular weight of these copolymers.

Temperatures from about ambient to about 250° F. can be used to form these gels. As the temperature inceases, gels form faster. When utilized for profile control in waterflooding and carbon dioxide enhanced recovery operations, the gels may be formed in-situ. When employed in said enhanced recovery operations, the gels have exceptional stability at the temperatures, salinities, pH's and pressures encountered in the subterranean formation.

Contrary to the disclosure of U.S. Pat. No. 4,785,028, it has been found that no partial hydrolysis step is required to form the polymer gels described herein. While it is not known why this step is not required in forming the gels of this invention, it is though that it may be related to the copolymer's higher molecular weight or that perhaps some hydrolysis takes place when the gels are formed as disclosed herein.

The aqueous crosslinked gel compositions and the process for selectively plugging regions of higher permeability within oil-bearing formations according to the present invention can be used in conjunction with those flooding operations in which a flooding fluid, usually water or carbon dioxide, is injected into a formation through injection wells which extend from the surface of the earth into the formation.

The following data demonstrate the extent of the unexpected beneficial results obtained with the crosslinked polymeric gels of the present invention. The invention is illustrated by the following non-limiting examples:

EXAMPLES 1–10

A one-percent stock solution of Hoechst ® Hostomer V 3140 anionic acrylamide copolymer was prepared in accordance with the aforementioned recommendations of the manufacturer prior to preparing the gel solutions of Examples 1–10. As shown in Table 1 below, three types of crosslinking agents were utilized. The transition metal ion crosslinking agent used was $Cr^{+3}$, prepared in the well-known manner from $Cr(NO_3)_3$. The amino resin used was Parez 613, a commercially available 3:1 mole ratio condensate of formaldehyde and melamine. This resin can be purchased from American Cyanamid Co., of Wayne, N.J. The phenolic crosslinking agents used were various blends of commercially available resorcinol and formaldehyde.

The gels of Examples 1–6 were not subjected to a partial hydrolysis step prior to crosslinking. The gels of Examples 7 and 8 were formed following the aging of the 1% copolymer stock solution in sealed ampoules for 5 days at 210° F. This step is known to cause partial hydrolysis of the copolymer. The gels of Examples 9 and 10 were formed following the subjection of the 1% copolymer stock solution to a partial hydrolysis step. This step was accomplished by refluxing the stock solution of V 3140 in 0.5M NaOH for 15.5 hours, followed by cooling and neutralizing with concentrated HCl.

All gel solutions were prepared in distilled water (total dissolved solids (TDS)=0). The pH of the various solutions was adjusted to simulate either a water flooding application (pH of about 5 to 7) or a carbon dioxide flooding application (pH of about 3.5). Solutions of 0.1N NaOH or 0.1N HCl were used to adjust the pH to the desired level. The gels were stored at 175° F. for periods ranging from 16 to 19 weeks. Results are presented in Table 1.

TABLE 1

Gel Stability at 175° F.
All Gels Prepared in Distilled Water
Test Duration: 16-19 Weeks
Crosslinking Agent Concentration

| Ex. | Copolymer[1] Conc, PPM | $Cr^{+3}$ Ions (PPM) | Amino Resin[2] (PPM) | Phenolic Resin Resorcinol (PPM) | Phenolic Resin HCHO (PPM) | pH | Comments |
|---|---|---|---|---|---|---|---|
| 1 | 5000 | 440 | 0 | 0 | 0 | 5.45 | Loose gel |
| 2 | 6000 | 0 | 8400 | 0 | 0 | 3.55 | Stiff gel |
| 3 | 6300 | 0 | 8360 | 0 | 0 | 6.87 | Loose gel |
| 4 | 1900 | 0 | 3300 | 0 | 0 | 3.60 | Loose gel |
| 5 | 5200 | 0 | 0 | 2000 | 2800 | 3.50 | Stiff gel |
| 6 | 4000 | 0 | 0 | 1000 | 1850 | 3.40 | No syneresis |
| 7 | 5000[3] | 460 | 0 | 0 | 0 | 6.20 | Firm gel |
| 8 | 5000[3] | 0 | 4000 | 0 | 0 | 3.50 | No syneresis |
| 9 | 4750[4] | 0 | 2480 | 0 | 0 | 6.60 | No syneresis |
| 10 | 5600[4] | 0 | 0 | 1785 | 2140 | 3.30 | No syneresis |

[1]Hoechst ® Hostamer V 3140 anionic acrylamide copolymer.
[2]Parez 613, 3:1 mole ratio condensate of formaldehyde/melamine.
[3]Copolymer solution aged in glass ampoule for 5 days at 210° F. prior to forming gel and storing at 175° F. Procedure causes partial hydrolysis.
[4]Copolymer solution subjected to partial hydrolysis.

As indicated, thermal and hydrolytic gel stability was found to be excellent in all cases. Additionally, these examples show that the high molecular weight copolymer can be used for profile control in waterflooding (gels 1, 3, 7 and 9) and $CO_2$-flooding (gels 2, 4, 6, 8 and 10) operations. Stiff gels (2 and 5) and loose gels (1, 3 and 4) can be made. Very low concentrations can be used; gel 4 was made with only 1900 ppm of copolymer. While not found to detract in any way from gel stability, as shown by the excellent results obtained using any of the crosslinking agents, partial hydrolysis is not required to form the novel gels of this invention.

Examples 11-22

The anionic acrylamide copolymer ® Hostamer V 3140 was dispersed as before in the various brines identified in Table 2, below. A full matrix of samples of 3000 ppm V 3140, 1000 ppm resorcinol and 1850 ppm formaldehyde were prepared in synthetic sea water (3% salinity) and 6, 12 and 23% brines (90% NaCl and 10% $CaCl_2$). No partial hydrolysis step was utilized prior to solution preparation. The pH level used for all samples was 3.5. The samples prepared were stored for evaluation at 140°, 175° and 210° F. Results are as follows:

TABLE 2

Gel Stability at pH = 3.5
Each Gel Contains: 5000 ppm Copolymer
1000 ppm Resorcinol and 1850 ppm Formaldehyde

| Ex. | Salinity, % TDS | Test Temp | Syneresis, in Percent, At 4 Weeks | 8 Weeks | 12 Weeks |
|---|---|---|---|---|---|
| 11 | Sea Water | 140 | 0 | 0 | 0 |
| 12 | 6 | 140 | 0 | 0 | 0 |
| 13 | 12 | 140 | 0 | 0 | 2 |
| 14 | 23 | 140 | 8 | 22 | 40 |
| 15 | Sea Water | 175 | 3 | 3 | 3 |
| 16 | 6 | 175 | 7 | 10 | 15 |
| 17 | 12 | 175 | 4 | 10 | 13 |
| 18 | 23 | 175 | 3 | 7 | 8 |
| 19 | Sea Water | 210 | 22 | 35 | Discontinued |
| 20 | 6 | 210 | 10 | 25 | Discontinued |
| 21 | 12 | 210 | 18 | 50 | Discontinued |
| 22 | 23 | 210 | 30 | Discontinued | Discontinued |

As shown, test results indicate that the gels of this invention provide good thermal and hydrolytic stability at temperatures of up to at least 210° F. and at salinities ranging from sea water (TDS~3%) to up to at least a 23% TDS brine. For the samples stored at 140° F., virtually no syneresis was observed for the gels prepared in solutions of ≤12% salinity. The 23% salinity gel began to synerese badly after 10 weeks. The gels stored at 175° F. were found to yield the best stability, with only minor syneresis observed even at 23% salinity. Generally acceptable gels were obtained even at 210° F. Significant syneresis was observed at 6-8 weeks, with testing discontinued when the samples exceeded about 50% syneresis. It must be noted that while gels exhibiting low syneresis are thought to be preferred, it is not known whether the gels exhibiting high syneresis would be suitable for profile control. It is thought that even the high syneresis gels may provide some utility in profile control operations. While only phenolic crosslinking agents were used in the tests of gels at various salinities, it is believed that the results obtained and presented in Table 2 are translatable to the other organic crosslinking agents disclosed herein.

Where it is desired to obtain increased sweep efficiency, gels of this invention can be used to plug a previously swept portion of a formation. These gels can be directed to areas of increased porosity by utilization in any of the below methods, as well as others which those skilled in the art will plainly recognize. Additionally, the permeability control treatment may be carried out periodically when necessary to achieve the desired permeability profile.

One method where gels of this invention can be utilized is during a waterflooding process for the recovery of oil from a subterranean formation. After plugging the more permeable zones of a reservoir with the novel gels of this invention, a waterflooding process can be commenced or resumed. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a carbon dioxide flooding process, either alone, or in conjunction with a cyclical steam stimulation in a heavy oil recovery process to obtain greater sweep efficiency. Cyclic carbon dioxide steam stimulation can be commenced or resumed after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process for recovering oil. Prior to commencement or resumption of the carbon dioxide process, the more permeable zones are plugged with these novel gels.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. An aqueous crosslinked acrylamide copolymer gel formed in the absence of a partial hydrolysis step, consisting essentially of:
   (a) water;
   (b) a viscosifying amount of an anionic acrylamide copolymer of high weight-average molecular weight produced by copolymerizing an aqueous mixture of monomers comprising about 5 to 95 weight percent of 2-acrylamido-2-methylpropane-sulfonic acid; about 2 to 95 weight percent of N-vinyl-N-methyl acetamide; and about 5 to 93 weight percent of acrylamide, said copolymer having a weight-average molecular weight of at least $5 \times 10^6$ and able to form a stable crosslinked gel without first subjecting said copolymer to a partial hydrolysis step;
   (c) a crosslinking agent selected from the group consisting of transition metal ions, phenolic resins and amino resins wherein said crosslinking agent is present in an amount sufficient to cause gelation of the aqueous solution of said anionic acrylamide copolymer of high weight-average molecular weight and produce the crosslinked gel.

2. The gel of claim 1, wherein said crosslinking agent is said transition metal ions.

3. The gel of claim 2, wherein said transition metal ions are $Cr^{+3}$ ions.

4. The gel of claim 3, wherein said $Cr^{+3}$ ions are present in an amount of about 50 to about 750 ppm.

5. The gel of claim 1, wherein said crosslinking agent is an amino resin.

6. The gel of claim 5, wherein said amino resin is a condensate of formaldehyde and melamine.

7. The gel of claim 6, wherein said formaldehyde and melamine are present in a 3:1 molar ratio.

8. The gel of claim 7, wherein said amino resin is present in an amount of 0.02 to 5.0 weight percent.

9. The gel of claim 1, wherein said crosslinking agent is a phenolic resin.

10. The gel of claim 9, wherein said phenolic resin comprises about 1 to about 99 weight percent of at least one phenolic compound selected from the group consisting of phenol, resorcinol, catechol, phloroglucinol, pyrogallol, 4,4'-diphenol and 1,3-dihydroxynaphthalene; and about 1 to about 99 weight percent of at least one aldehyde component selected from the group consisting of aliphatic monoaldehydes, aromatic monoaldehydes, aliphatic dialdehydes and aromatic dialdehydes.

11. The gel of claim 10, wherein said phenolic compound is resorcinol and said aldehyde component is formaldehyde.

12. The gel of claim 11, wherein said phenolic resin is present in an amount of about 0.02 to about 5.0 weight percent.

13. The gel of claim 12, wherein said copolymer is present in an amount of about 0.05 to about 1.0 weight percent.

14. The gel of claim 13, wherein said water is a brine.

* * * * *